United States Patent [19]
Nitta et al.

[11] Patent Number: 5,347,412
[45] Date of Patent: Sep. 13, 1994

[54] FLOATING MAGNETIC HEAD

[75] Inventors: Hideo Nitta, Mooka; Kunio Kanai, Konosu; Yasuo Arai, Kumagaya, all of Japan

[73] Assignee: Hitachi Metals, Ltd., Tokyo, Japan

[21] Appl. No.: 41,056

[22] Filed: Mar. 31, 1993

[30] Foreign Application Priority Data

Apr. 6, 1992 [JP] Japan .................................. 4-113090

[51] Int. Cl.$^5$ .......................... G11B 5/60; G11B 21/21
[52] U.S. Cl. ........................................................ 360/103
[58] Field of Search ......................................... 360/103

[56] References Cited

U.S. PATENT DOCUMENTS

| | | | |
|---|---|---|---|
| 4,805,059 | 2/1989 | Tsuchiya et al. | 360/125 |
| 5,057,374 | 10/1991 | Tsuchiya et al. | 428/426 |
| 5,168,407 | 12/1992 | Shimizu et al. | 360/103 |

FOREIGN PATENT DOCUMENTS

| | | |
|---|---|---|
| 1-233713A | 9/1989 | Japan . |
| 1-251308A | 10/1989 | Japan . |
| 2-187915A | 7/1990 | Japan . |
| 2-243562A | 9/1990 | Japan . |
| 2-296765A | 12/1990 | Japan . |
| 3-146456A | 6/1991 | Japan . |

*Primary Examiner*—Robert S. Tupper

[57] ABSTRACT

A floating magnetic head including a non-magnetic substrate having a two-phase structure which substrate is used as a slider so as to enable a coefficient of thermal expansion to be controlled over a wide range. In air bearing surface is made to be properly rough to improve CSS characteristics of a floating magnetic head. A non-magnetic substrate material contains MnO, NiO, as main components, and $Al_2O_3$, as a sub composition, or a part of the sub component is replaced by at least one substance selected from a group consisting of CaO, $Y_2O_3$, $ZrO_3$, ZnO, SrO. The non-magnetic substrate material has a two-phase structure including a rock salt type structure of (MnO, NiO) and a spinel structure of (MnO, NiO) $Al_2O_3$ or (MnO, NiO) $Al_2O_3$ containing at least one substance selected from a group consisting of CaO, $Y_2O_3$, $ZrO_3$, ZnO, SrO. An average grain size of the substrate is from 5 to 15 $\mu$m.

8 Claims, 9 Drawing Sheets

FIG. II

FLOATING MAGNETIC HEAD

BACKGROUND OF THE INVENTION

1. Field of the Invention

The present invention relates to a floating thin-film magnetic head and a composite type floating magnetic head for small hard disks in which a non-magnetic substrate is used as a slider.

2. Description of the Related Art

Floating magnetic heads which are for use in a small high-density 3.5-inch or 2.5-inch magnetic disk device are classified into two types: one, a thin-film magnetic head whose demand has been increasing in order to cope with a further increase in the recording density, shown in FIG. 1, and the other, a composite type magnetic head which has been currently used extensively, shown in FIG. 2.

FIG. 1 is a perspective view of an example of a thin-film magnetic head. A magnetic head 11 shown in FIG. 1 includes a slider 12, air bearings 13 and an electromagnetic converting unit 14.

In the electromagnetic converting unit 14, an $Al_2O_3$ film is formed on an end surface of a non-magnetic slider, and a thin film, such as an amorphous film, is formed on that $Al_2O_3$ film by the thin film lithographic process. Therefore, it is necessary to use proper materials so that the coefficients of thermal expansion of the materials may be in an appropriate relation to each other from the manufacturing and usage viewpoints, and a substrate material mainly composed of alumina-titanium carbide (ATC) is thus generally used as the slider material.

In the thin film magnetic head, the saturation magnetic flux density of the magnetic amorphous thin film is from 8000 to 9000 G, and the magnetic permeability thereof is about 2,000 (1 MHz). In order to achieve a high-density recording, a magnetic thin film of Fe—Al—Si exhibiting excellent soft magnetic characteristics has been put into practical use. The saturation magnetic flux density of the Fe—Al—Si thin film is about 11,000, and the magnetic permeability thereof is 3,000 (1 MGz). The coefficient of thermal expansion of the Fe—Al—Si magnetic thin film, which is (145° to 150°)$\times 10^{-7}$/°C., is larger than the coefficient of thermal expansion of the amorphous thin film, which is (120° to 130°)$\times 10^{-7}$/°C. Therefore, a non-magnetic substrate material in which $Al_2O_3$ is added to the main components of MnO and NiO is used to form the slider in the thin-film magnetic head from the viewpoint of the coefficient of thermal expansion. The coefficient of thermal expansion of this non-magnetic substrate material is (135° to 145°)$\times 10^{-7}$/°C. Such a non-magnetic substrate has been proposed in, for example, Japanese Patent Laid-Open Publication Nos. 3-146456 and 2-296765, which substrate of this prior art has a rock salt structure of MnO, NiO, and is composed of 40 to 70 mol % of MnO and 30 to 60 mol % of NiO. Another non-magnetic substrate disclosed in Japanese Patent Laid-Open Publication No. 2-296765 has a rock salt structure of MnO, NiO, which is composed of 67 to 90 mol % of MnO and 10 to 33 mol % of NiO. These non-magnetic substrate materials have a desirable Vickers hardness from 550 to 700 kg/mm$^2$, have less pores, can be readily precision machined, assure generation of less cracks and less chipping during machining, and are chemically stable.

FIG. 2 is a perspective view of a composite type floating magnetic head.

In FIG. 2, a composite type floating magnetic head 21 has a slider which is constituted by a non-magnetic substrate made of, for example, a ceramic. A magnetic head core 23 is fixed to and retained in a slit 25 formed in an air bearing 24 by a mold glass 26.

A Mn—Zn single crystal ferrite having a coefficient of thermal expansion of 120°$\times 10^{-7}$/°C. at a temperature ranging from 100° C. to 400° C. is desirably used as the magnetic head core. If the coefficient of thermal expansion of the slider greatly differs from that of the magnetic head core, cracks are apt to occur in the glass which fixes the magnetic head core in the slit of the slider. Therefore, it is necessary that the coefficients of thermal expansion of both the magnetic head core and the slider are in levels approximating each other. One example of a non-magnetic substrate suitably used as such a composite type slider has been proposed in Japanese Patent Laid-Open Publication No. 2-243562. This non-magnetic substrate has a $TiO_2$—BaO—CaO type composition to which at least one substance selected from a group consisting of $Al_2O_3$, NiO, SrO, MgO, $Y_2O_3$, WO, $MoO_3$, $In_2O_3$ and $ZrO_2$ is added. The coefficient of thermal expansion of this non-magnetic substrate, which is about 115°$\times 10^{-7}$/°C., is close to that of the Mn—Zn ferrite. The crystal grains of this non-magnetic substrate are fine in size and uniform, and thus have less pores between crystal grains due to the addition of additives, such as $Al_2O_3$. Therefore, the non-magnetic substrate has an excellent machining property and assures less occurrence of chipping.

In order to cope with a high-density recording which has been taking place in recent years, a hard disk in which a magnetic substance is closely attached to a disk substrate by plating or sputtering is used as a magnetic recording medium in the magnetic disk device.

Such a disk surface manufactured by plating or sputtering has a higher surface precision than a conventional coating type disk surface, and is coated with a lubricant. Due to this constitution, a sticking phenomenon, which would not be a serious problem in a conventional head, occurs between the head and the disk surface. More specifically, when the precision of the surface of the head which opposes the magnetic recording medium is high, the surface of the disk sticks to the surface of the head which opposes the disk when the disk is at a halt. A sticking force between the head and the disk may exceed the torque of a motor which rotates the disk. Such a sticking force makes the operation of the disk drive difficult and reduces the life of the head which performs the CSS (contact-start-and-stop) operation. Particularly, in a small magnetic disk which requires a floating height of 0.1 μm or less, a sticking force causes a serious problem.

In order to alleviate the sticking phenomenon and thereby improve the CSS characteristics, it has been proposed to machine the surface of the head which opposes the disk so that it has a slight roughness.

For example, Japanese Patent Application No. sho 63-295652 discloses the floating magnetic head made of a polycrystal. In an air bearing surface of the above-mentioned magnetic head which opposes a magnetic recording medium, an average difference in the depth between the crests and the troughs is from 50 to 200 Å, an average pitch at which the crests and troughs are repeated is from 5 to 20 μm, and an air bearing surface portion where a height defined as a difference between a crest and a trough changes very much is made to extend along the grain boundary of crystals. A monolithic magnetic head, which is an example of the above-described floating magnetic head, is shown in FIG. 8.

However, the monolithic type magnetic head is constituted by a soft magnetic substance of ferrite, and thus suffers from problems in that the inductance (L) of the material is large, in that the high-frequency response is poor, and in that noises are readily generated. Therefore, the monolithic type magnetic head is not suitable for use in a magnetic disk device whose recording density will be further increased in the future.

The maximum grain size of the non-magnetic substrate material, disclosed in Japanese Patent Laid-Open Publication No. 2-296765 and having a rock salt structure whose composition consists of 67 to 90 mol % of MnO and 10 to 33 mol % of NiO, is max. 1 μm. The maximum grain size of the non-magnetic substrate material, disclosed in Japanese Patent Laid-Open Publication No. 3-146456 and having a rock salt structure whose composition consists of 40 to 70 mol % of MnO and 30 to 60 mol % of NiO, is from 3 to 4 μm. Therefore, even when the surface of the non-magnetic substrate material is made irregular, it is impossible to obtain a desirable difference in the average depth between the crests and troughs and a desirable average pitch at which the crests and troughs are repeated, that is, it is difficult to improve CSS characteristics with these non-magnetic substrate materials in such a degree as the CSS characteristics are improved in the monolithic type magnetic head.

Various attempts have also been made in terms of the magnetic disk in order to improve CSS characteristics. The magnetic disk is subjected to a working called "texture". The texture is a working in which the surface of the disk substrate is made irregular in such a manner that it has an average surface roughness of about 10 nm and that crests and troughs are repeated at a pitch of 100 to 200 nn, as shown in FIGS. 9A and 9B by a roughness curve in the radius direction of a disk, measured by HIPOSS (a contact needle type fine form measuring device). After the texture, a base film of, for example, Cr is formed on the irregular surface of the disk substrate, and then a magnetic metal thin film of, for example, Co—Cr—Ta is formed on the base film by sputtering or the like. Subsequently, a protective film of, for example, carbon is formed on the magnetic metal thin film to manufacture a magnetic disk which is available on the market. The irregularities formed by the texture reduce the contact area of the disk with which the disk makes contact with the air bearing surface of the magnetic head, and thereby adjust the sticking force to an appropriate value.

In a composite type head for use in such a magnetic disk device, a non-magnetic substrate material in which at least one substance selected from a group consisting of $Al_2O_3$, NiO, SrO, MgO, $Y_2O_3$, WO, $MoO_3$, $In_2O_3$ and $ZrO_2$ is added to a $TiO_2$—BaO—CaO type composition is suitably employed as a slider because of proper coefficient of thermal expansion and proper workability. However, this material having a Vickers hardness of about 850 kg/mm$^2$ is so hard in hardness against the textured disk that there is such a problem as the crest portion of the disk is apt to be locally abraded by a magnetic head during a contact-start-stop period in which the magnetic head slides on the disk. Also, it is difficult to form a roughness on the surface of the non-magnetic substrate material, as in the case of a non-magnetic substrate material whose composition mainly consists of MnO and NiO and whose grain size is small.

SUMMARY OF THE INVENTION

In view of the aforementioned problems, the present inventors examined the composition of the non-magnetic substrate material mainly composed of MnO and NiO, the additives and the proportion of each of the additives and the manufacturing conditions, and obtained a floating magnetic head which assures desirable irregularities (roughness) and improved CSS characteristics.

The present invention provides a floating magnetic head whose slider is constituted by a non-magnetic substrate which contains MnO and NiO, as main components, and $Al_2O_3$, as a sub component, which has a two-phase structure mainly consisting of a rock salt type structure of (MnO, NiO) and a spinel structure of (MnO, NiO) $Al_2O_3$, and which has an average grain size of 5 to 15 μm. A slider may also be constituted by a non-magnetic substrate which has a two-phase structure mainly consisting of a main composition of a rock salt type structure of (MnO, NiO) and a sub composition of a spinel structure of (MnO, NiO) $Al_2O_3$, a part of which sub composition is replaced by at least one substance selected from a group consisting of CaO, $Y_2O_3$, $ZrO_2$, ZnO and SrO, the structure of the substrate being a two phase structure comprising a rock salt type structure of (MnO, NiO), $Al_2O_3$ and a spinel structure of (MnO, NiO) $Al_2O_3$ containing at least one selected from the group consisting of CaO, $Y_2O_3$, $ZrO_2$, ZnO and SrO, which substrate has an average grain size of from 5 to 15 μm.

A more preferable average crystal grain size of the non-magnetic substrate constituting the slider is between 8 and 12 μm. A more preferable composition of the non-magnetic substrate comprises MnO: 20 to 80 wt % in terms of MnO, NiO: 20 to 80 wt % in terms of NiO and $Al_2O_3$: 1 to 20 wt % in terms of $Al_2O_3$, or alternatively it may comprises $Al_2O_3$: 1 to 15 wt % in terms of $Al_2O_3$ and at least one selected from the group consisting of $Y_2O_3$, $ZrO_2$, ZnO and SrO: 5 wt % or less in total in terms of $Y_2O_3$, $ZrO_2$, ZnO and SrO which at least one replace a part of $Al_2O_3$.

In the present invention a slider of a composite type floating magnetic head or of a floating thin film magnetic head is constituted by the aforementioned non-magnetic substrate. As one phase of the rock type structure low in hardness is selectively removed from the air bearing surface thereof constituted by a two phase structure consisting of the spinel structure and the rock salt structure so that irregularities (roughness) may be formed on the air bearing surface, the improvement of the CSS characteristics can be obtained.

A composite type magnetic head employing the thus-arranged slider is manufactured by incorporating a magnetic head core in a slider formed to have roughness by working a non-magnetic substrate material having a predetermined composition and then by processing the substrate so that it has a final shape. In this case, a raw material is previously processed so that a magnetic circuit may be formed on the processed face by use of a thin film technique, and then the thus processed material is worked to have a shape of magnetic head to thereby produce a thin film magnetic head.

By using any proper means, it is necessary to work the air bearing surface of the thus-manufactured magnetic head which opposes a magnetic recording medium so that it has roughness or irregularities (difference in level occurring by providing recesses and projections). In this way, since the air bearing surface of the magnetic head which makes contact with the magnetic disk has proper irregularities, the sticking force between the magnetic disk and magnetic head is reduced, improving CSS characteristics. When the magnetic head 1 shown in FIG. 2 is in a normal (usual) halt state, a portion which is in contact with a stationary disk is an area A (which is an area other than an inclined portion B provided at the front edge portion of the head) in the air bearing surfaces 3 and 4. In this invention, although all of the areas A and B or a part C thereof shown in FIG. 2 may be treated so that they have a specified surface roughness, it is desirable regarding the CSS characteristics that masking etc. is performed so that area A except the magnetic head core is treated.

The non-magnetic substrate which constitutes a slider for use in a floating magnetic head contains MnO and NiO as main components and $Al_2O_3$ as a sub component. Alternatively, the non-magnetic substrate has a two-phase structure consisting of a first phase having a rock salt structure of (MnO, NiO) and a second phase having a spinel structure of (MnO, NiO) $Al_2O_3$ or a second phase having a spinel structure of (MnO, NiO) $Al_2O_3$ which contains at least one substance selected from a group consisting of CaO, $Y_2O_3$, $ZrO_2$, ZnO and SrO, which at least one substance replaces a part of $Al_2O_3$.

The crystal grain size can be set between 5 and 15 μm, more preferably, between 8 and 12 μm by controlling the manufacturing conditions of primary sintering and HIP (hot isostatic pressing).

The hardness of the first phase having a rock salt structure is lower than the hardness of the second phase having a spinel structure. In the two-phase non-magnetic magnetic substrate material having a rock salt structure and a spinel structure, the amount of a removed first phase can be made different from the amount of a removed second phase by working the surface of the substrate material by use of, for example, inverse sputtering, utilizing this difference in the hardness between the two phases. For example, the surface of the substrate material is made irregular or rough by making the first phase having the rock salt structure recessed while making the second phase having the spinel structure protruded. In this way, the sticking force between the magnetic recording medium and the magnetic head can be reduced, and CSS characteristics can thus be improved. If the difference in the height (level) between the adjacent crest and trough is small, the effect of the irregularities is reduced. A difference in the level of 30 Å or above is therefore desirable. A desirable pitch at which the crest and trough adjacent to each other are repeated is 5 to 20 μm from the viewpoint of stable contact between the head and the magnetic recording medium.

In the non-magnetic substrate according to the present invention, since the crystal grain size can be set between 5 and 15 μm, and more preferably, between 8 and 12 μm, the air bearing surface can be made irregular by, for example, inverse sputtering, to thereby improve CSS characteristics.

In the first phase having a rock salt structure, a coefficient of thermal expansion of about 120° to 150°$\times 10^{-7}$/°C. can be obtained by changing the ratio of MnO to NiO. In the second phase having a spinel structure, a coefficient of thermal expansion of about 70° to 80°$\times 10^{-7}$/°C. can be obtained by changing the ratio of MnO to NiO, as in the case of the first phase.

It is thus possible to obtain a non-magnetic substrate having a coefficient of thermal expansion desirable to the composite type magnetic head or thin-film magnetic head by properly selecting the composition ratio and thereby suitably changing the composition or structure.

In the present invention, the proportion of each of the main components of MnO and NiO is set between 20 and 80 wt %, because a proportion outside of the above-described range deteriorates sintering and because the above-described proportion enables the ratio of the crests to the troughs to be properly set to 20 to 80% when the air bearing surface is made irregular by inverse sputtering.

Adding of $Al_2O_3$ readily generates the spinel type structure, and reduces the crystal grain size, thus reducing the void (pare). Adding of Cao, $Y_2O_3$, $ZrO_2$, ZnO and SrO which acts to replace a part of $Al_2O_3$ also reduces the crystal grain size, thus reducing the void.

If $Al_2O_3$ alone is added, a desirable proportion thereof is 1 to 20 wt %. If a part of $Al_2O_3$ is replaced by at least one of Cao, $Y_2O_3$, $ZrO_2$, ZnO and SrO, 1 to 15 wt % $Al_2O_3$ and 5 wt % or less of other substance enhance the sintering property and reduces the void.

BRIEF DESCRIPTION OF THE DRAWINGS

FIG. 11 is a photograph showing the structure of an inversely sputtered non-magnetic substrate having a two-phase structure according to the present invention.

DETAILED DESCRIPTION OF THE PREFERRED EMBODIMENTS

Embodiments of the present invention will be described below.

First Embodiment

Non-magnetic substrates having a two-phase structure comprising a rock salt structure of (MnO, NiO) and a spinel structure of (MnO, NiO) $Al_2O_3$ which contained at least one of CaO, $Y_2O_3$, $ZrO_2$, ZnO and SrO were manufactured in the manner described below. In the above-described non-magnetic substrates, the proportions of the main components, MnO and NiO, and the proportions of the sub components, $Al_2O_3$, and at least one of CaO, $Y_2O_3$, $ZrO_2$, ZnO and SrO, were changed. In the process of production, the crystal grain size was intentionally enlarged by raising either the primary sintering temperature or HIP temperature even in a case of the same chemical composition.

First, each of special grade reagents of $MnCO_3$, NiO, which were obtained from the market, was weighed. After pure water was added to the reagents, the mixture was pulverized in a ball mill for 24 hours. Thereafter, the mixture was calcinated at a temperature ranging from 800° to 1000° C. for 4 hours in $N_2$ atmosphere to obtain (MnO, NiO) composed of MnO and NiO. Next, the obtained (MnO, NiO) was pulverized. After $Al_2O_3$, CaO, $Y_2O_3$, $ZrO_2$, ZnO, SrO was added, the mixture of these was wet pulverized.

Next, the pulverized material was shaped into a block having dimensions of 60×30×13 (mm) under a pressure of 3 ton/cm², primarily sintered (in $N_2$ atmosphere at a temperature ranging from 1250° C. to 1550° C. for 6 hours), and then subjected to HIP treatment (in Ar atmosphere at a temperature ranging from 1250° C. to 1450° C. for 1 hour) to obtain a non-magnetic substrate.

The primary sintering temperature of 1250° C. to 1550° C. and the HIP treatment temperature of 1250° C. to 1450° C. were higher than the maximum primary sintering temperature of 1300° C. and the maximum HIP treatment temperature of 1250° C., which were the manufacturing conditions for producing a non-magnetic substrate having the average grain size of 3 to 4 μm.

Figure 10:
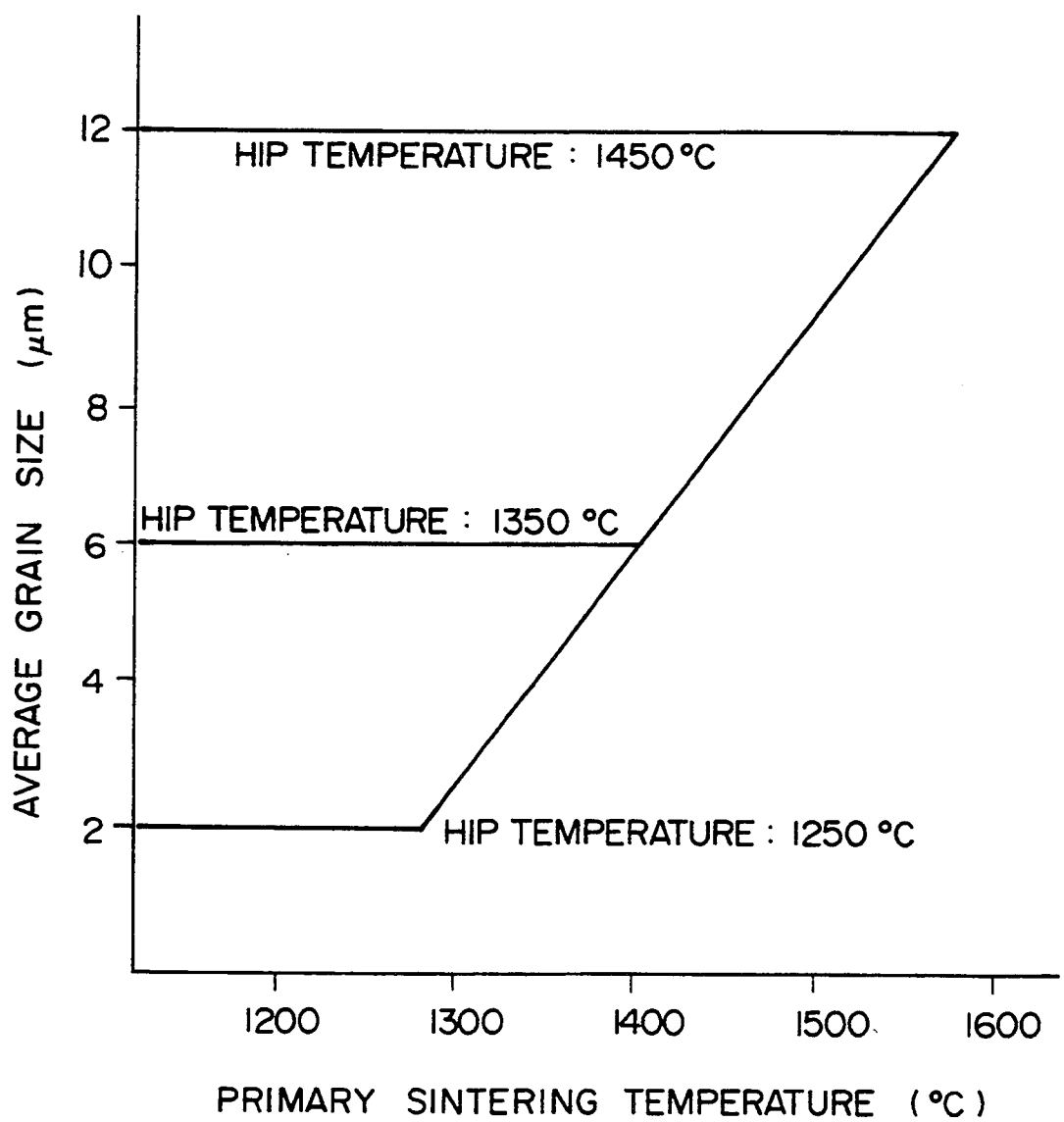
FIG. 10 is a graph showing the relation between the primary sintering temperature and HIP temperature and the average grain size.

FIG. 10 shows the relation between the primary sintering temperature and the HIP temperature which affect the grain size of the non-magnetic substrate whose composition consists of MnO: 51 wt %, NiO: 36 wt %, $Al_2O_3$: 13 wt %. Under the conventional temperature conditions, the average grain size is limited to 3 to 4 μm. However, the average grain size can be increased up to 12 μm by increasing either the primary sintering temperature or the HIP temperature to a value higher than the conventional one. In a composition consisting of MnO: 39wt %, NiO: 59 wt %, $Al_2O_3$: 2wt %, the average grain size can be increased up to 15 μm. Although a further increase in the treatment temperature further increases the average grain size, an average grain size of more than 15 μm deteriorates the sintering property, thus deteriorating the structure of a non-magnetic substrate.

Table 1 shows how the average grain size of non-magnetic substrates according to the present invention and that of conventional non-magnetic substrates change by changing the primary sintering temperature or HIP temperature. Even when the composition and the proportion of the additive are the same, growth of the gain size can be accelerated by increasing either of the treatment temperatures, thus increasing the grain size. The non-magnetic substrate according to the present invention has also an advantage in that the composition, the coefficient of thermal expansion, and the hardness thereof can be controlled to proper values by changing the treatment temperature conditions.

TABLE 1

| | Main component (mol %) | | Additive $Al_2O_3$ (wt %) | Grain size (μm) | Primary sintering temperature (°C.) | HIP temperature (°C.) |
| --- | --- | --- | --- | --- | --- | --- |
| | MnO | NiO | | | | |
| Comparative Sample 1 | 60 | 40 | 13 | 3~4 | 1250~1350 | 1250 |
| Example 1 | 60 | 40 | 13 | 5~8 | 1250~1350 | 1350 |
| Example 2 | 60 | 40 | 13 | 5~8 | 1400~1450 | 1250 |
| Example 3 | 60 | 50 | 13 | 8~12 | 1250~1350 | 1450 |

It was examined how the grain size, the coefficient of thermal expansion, the hardness and the sintered state changed when the proportion of the main components of MnO and NiO and sub component of $Al_2O_3$ were changed and when part of $Al_2O_3$ was replaced by at least one of CaO, $Y_2O_3$, $ZrO_2$, ZnO and SrO. Table 2 shows the results of the examinations.

5 wt % or less of other components, such as Co, $SiO_2$, enhances the sintering property, reduces the void, and thus improves the characteristics of the non-magnetic substrate.

In judging from thermal expansion coefficients shown in Table 2, examples 1 through 3 can be suitably used, as sliders for thin-film magnetic heads which employ a magnetic Fe—Al—Si type thin film, and examples 6 through 12 being able to be suitably used as sliders for thin-film magnetic heads and composite magnetic heads which employ a magnetic amorphous film.

TABLE 2

| | Main component (wt %) | | Sub component (wt %) | | Grain size (μm) | Coefficient of thermal expansion α (× $10^{-7}$) | Hardness (Hv) | Sintered condition |
| --- | --- | --- | --- | --- | --- | --- | --- | --- |
| | MnO | NiO | $Al_2O_3$ | Others | | | | |
| Example | | | | | | | | |
| 1 | 20 | 79 | 1 | — | 10~12 | 140 | 650 | ○ |
| 2 | 29 | 69 | 2 | — | 12~14 | 139 | 700 | ○ |
| 3 | 39 | 59 | 2 | — | 13~15 | 134 | 670 | ○ |
| 4 | 78 | 20 | 2 | — | 8~10 | 126 | 800 | ○ |
| 5 | 48 | 32 | 20 | — | 5~6 | 100 | 750 | ○ |
| 6 | 51 | 36 | 13 | — | 8~12 | 116 | 750 | ○ |
| 7 | 50 | 35 | 13 | CaO:2 | 6~8 | 119 | 700 | ○ |
| 8 | 50 | 35 | 13 | $Y_2O_3$:2 | 6~8 | 115 | 800 | ○ |
| 9 | 50 | 35 | 13 | $ZrO_2$:2 | 6~8 | 115 | 770 | ○ |

TABLE 2-continued

| | Main component (wt %) | | Sub component (wt %) | | Grain size (μm) | Coefficient of thermal expansion α ($\times 10^{-7}$) | Hardness (Hv) | Sintered condition |
|---|---|---|---|---|---|---|---|---|
| | MnO | NiO | $Al_2O_3$ | Others | | | | |
| 10 | 50 | 34 | 13 | SrO:3 | 6~8 | 117 | 660 | ○ |
| 11 | 49 | 34 | 13 | ZnO:5 | 5~7 | 114 | 710 | ○ |
| 12 | 49 | 34 | 13 | CaO:2 SrO:2 | 6~8 | 118 | 680 | ○ |
| 13 | 49 | 40 | 13 | ZnO:2 $ZrO_2$:2 | 6~8 | 115 | 750 | ○ |
| Comparative Sample | | | | | | | | |
| 1 | 15 | 65 | 20 | | 2~3 | 120 | 850 | ○ |
| 2 | 51 | 36 | 13 | | 3~4 | 116 | 750 | ○ |
| 3 | 7 | 20 | 20 | — | | | | X |
| 4 | 90 | 10 | 0 | — | | | | X |
| 5 | 10 | 90 | 0 | — | | | | X |

(Comparison Sample 3: too pourous, Comparison Sample 4: cracked, Comparison Sample 5: too porous)

In each of the examples of the present invention, the hardness Hv thereof was 800 kg/mm² or less, which was an proper value as the non-magnetic substrate for use as a slider. The average grain size is between 5 and 15 μm. It was observed with a microscope that the examples had a two-phase structure comprising the rock salt structure and the spinel structure. The two-phase structure enables a desirable surface roughness having a desirable pitch to be provided. This may be achieved by removing, for example, a part of the rock salt structure having a lower hardness by inverse sputtering.

In the comparative samples 1 through 5 in which the primary sintering treatment temperature and the HIP treatment temperature were not proper, the grain size was small. When the proportion of MnO and that of NiO respectively exceeded 80 wt % or reduced to less than 20 wt %, properties obtained by the sintering are not proper, e.g., the void increased and occurrence of cracks increased.

FIG. 11 is a photograph of the structure subjected to inverse sputtering. It can be seen in FIG. 11 that the rock salt structure has been deeply removed by inverse sputtering to form a recessed portion while the spinel structure has not been removed much and has been left in a protruding shape. The boundary of the recessed and protruded portions, which is shown in a shadow, substantially extends along the boundary of the grains.

Figure 3A:
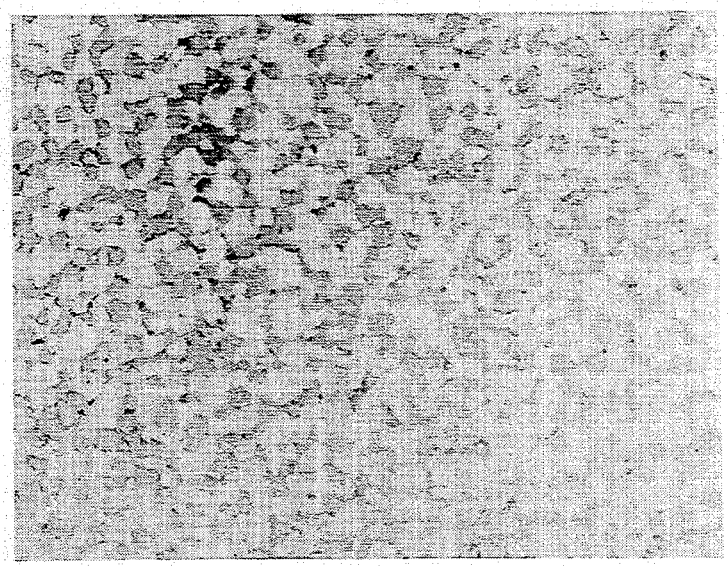
FIGS. 3A and 3B are respectively microscopic photographs showing the structure of a non-magnetic substrate according to the present invention and the structure of a non-magnetic substrate of a comparative example.
Figure 3B:
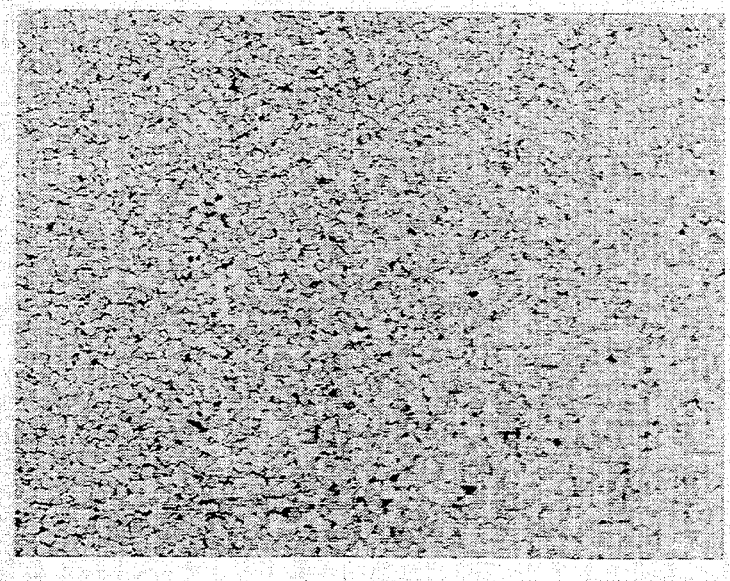

FIGS. 3A and 3B are microscopic photographs of the structure according to the present invention and of the structure of a comparative sample.

FIG. 3A shows the structure of a non-magnetic substrate according to the present invention which has an average grain size of 8 to 12 μm. FIG. 3B shows the structure of a non-magnetic substrate having an average grain size of 3 to 4 μm. The white portion indicates the rock salt structure, and the gray portion indicates the spinel structure.

The average grain size of the non-magnetic substrates according to the present invention, calculated in accordance with JIS-C-2563, was from 5 to 15 μm, preferably 8~12 μm which value range is proper to provide surface roughness.

The average grain size is defined according to JIS-C-2563 as follows:

$$D = 1/N \times L/n \times 1000 \, (\mu m)$$

where

Figure 1:
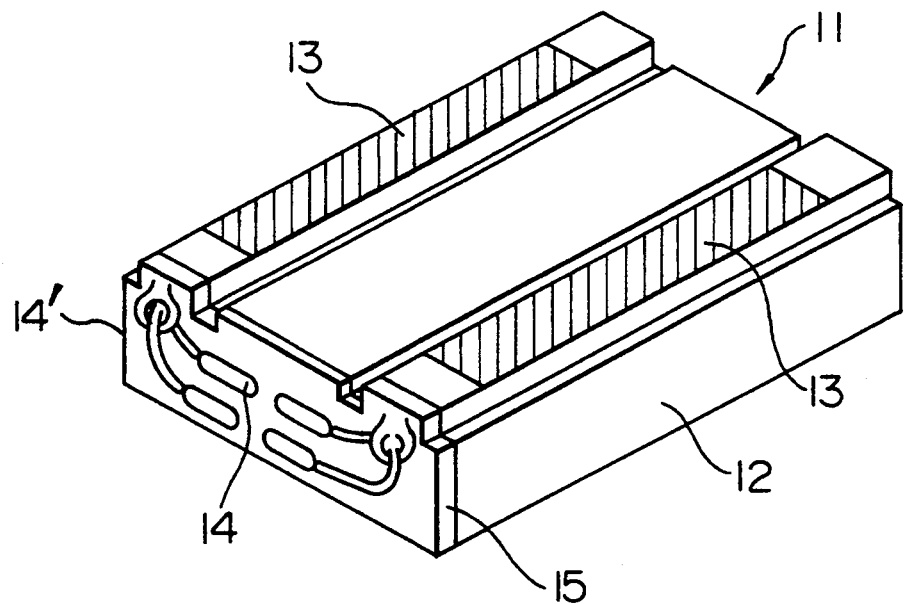
FIG. 1 is a perspective view of a floating thin-film magnetic head according to the present invention.

D: Average grain size
N: Magnification of a microscope
L: Length of a straight line
n: Number of grains cut across by a straight line Second Embodiment A composite type magnetic head was manufactured by a process comprising the steps of forming a slider of a non-magnetic substrate having two phases of a rock salt structure of (MnO, NiO) and a spinel structure of (MnO, NiO) $Al_2O_3$ containing at least one of CaO, $Y_2O_3$, $ZrO_2$, ZnO and SrO, and then incorporating a magnetic head core in that slider. The magnetic head core had a Mn-Zn single crystal ferrite core with a Fe—Al—Si type magnetic metal thin film formed thereon. As shown in FIG. 1, the air bearing surface of the slider of such a magnetic head which opposed the disk was made irregular by the inverse sputtering process. The inverse sputtering process is a process in which a working is performed by using the inversely sputtered state generated by a sputtering device. In a normal sputtering, a high voltage is applied to an inactive gas, for example, Ar gas, having a predetermined gas pressure to ionize Ar gas. Ions of Ar gas are bombarded to the surface of a target, ejecting the target particles. The ejected target particles are attached to another substrate to form a film. In an inverse puttering, the ionized inactive gas is bombarded to the slider surface to remove the atoms of the slider surface.

When the ionized gas is bombarded, the surface of each of the phases which form the slider is removed. At that time, since there is a difference in the atom coupling energy between the individual phase, the energy required to remove the surface is different, generating a difference in the amount of phase removed in the removal process. Consequently, fine differences in level are generated between the individual phase.

In this inverse sputtering process which is performed in an atomic scale state, it is possible to control the size of the differences in level by controlling a period of time. Inverse sputtering may be performed on a necessary portion alone with an unnecessary portion masked. Furthermore, other means, such as ion milling or chemical etching, may also be employed to form differences in level.

On the bearing surface which is made irregular or rough by inverse sputtering, crests of the spinel structure and troughs of the rock salt structure exist alternately, and the height changes very much at a portion (cliff) located between the crest and trough. The cliff portion extends along the boundary between the phase having the rock salt structure and the phase having the spinel structure. When there is an proper difference in the level between crests and troughs and when crests and troughs are repeated at a proper pitch, the sticking phenomenon between the head and the disk can be prevented or minimized. When the cliff portion extends along the phase boundary, CSS damage of the disk can be prevented. That is, since the cliff portion extends along the phase boundary, it has the property substantially equivalent to that of the single phase.

On the bearing surface of the slider which is treated in the manner described above, only the protruding portion thereof makes contact with the surface of the magnetic recording medium when the recording medium is at a halt (not driven), and most of the soft portion which is readily worn out forms a recessed portion and does not make contact with the surface of the magnetic recording medium. During the CSS operation in which the magnetic head and the magnetic recording medium are activated and stopped, the amount of dust occurring due to wear decreases, thus preventing the sticking phenomenon.

Figure 4:
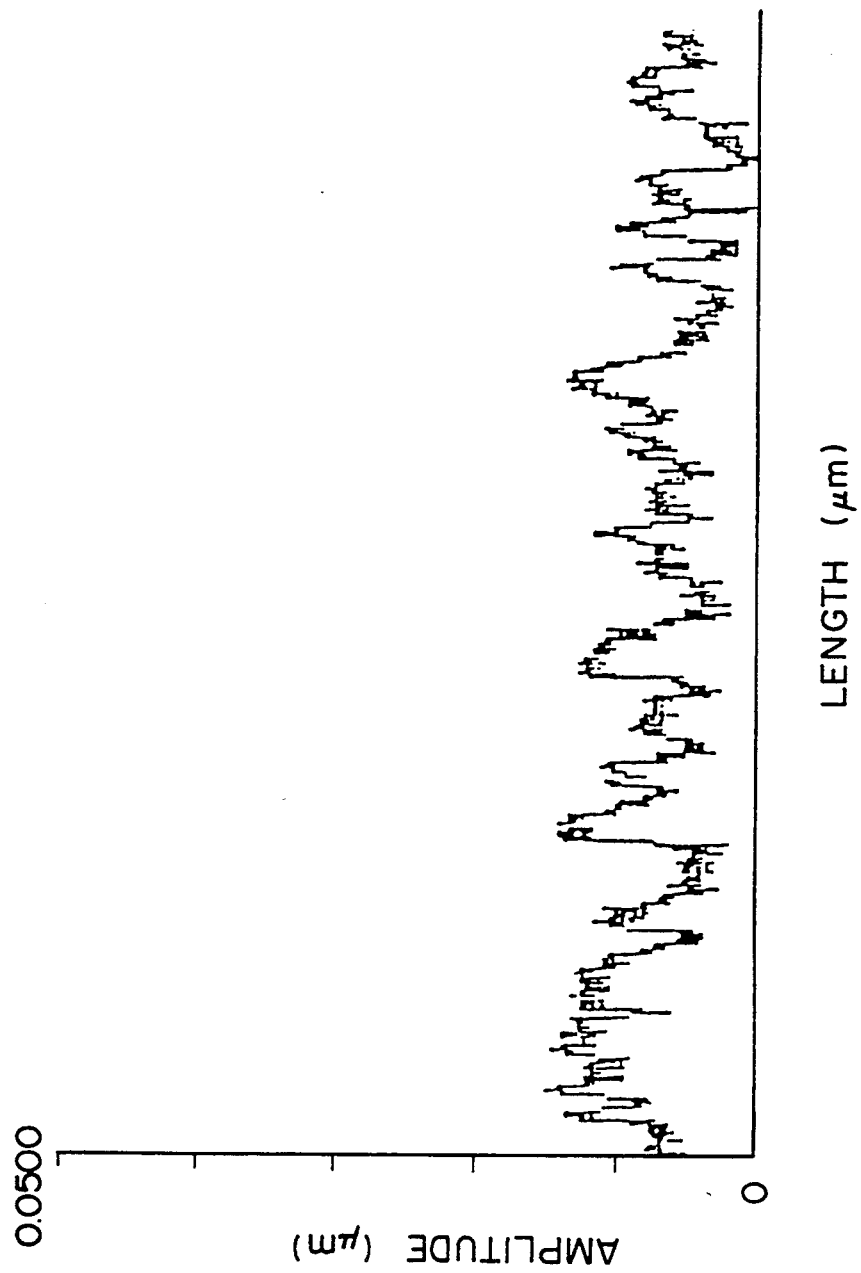
FIG. 4 shows a roughness curve obtained by measuring by HIPOSS an inversely sputtered air bearing of a slider which employs a non-magnetic substrate according to the present invention having an average grain size of 8 to 12 μm.
Figure 5:
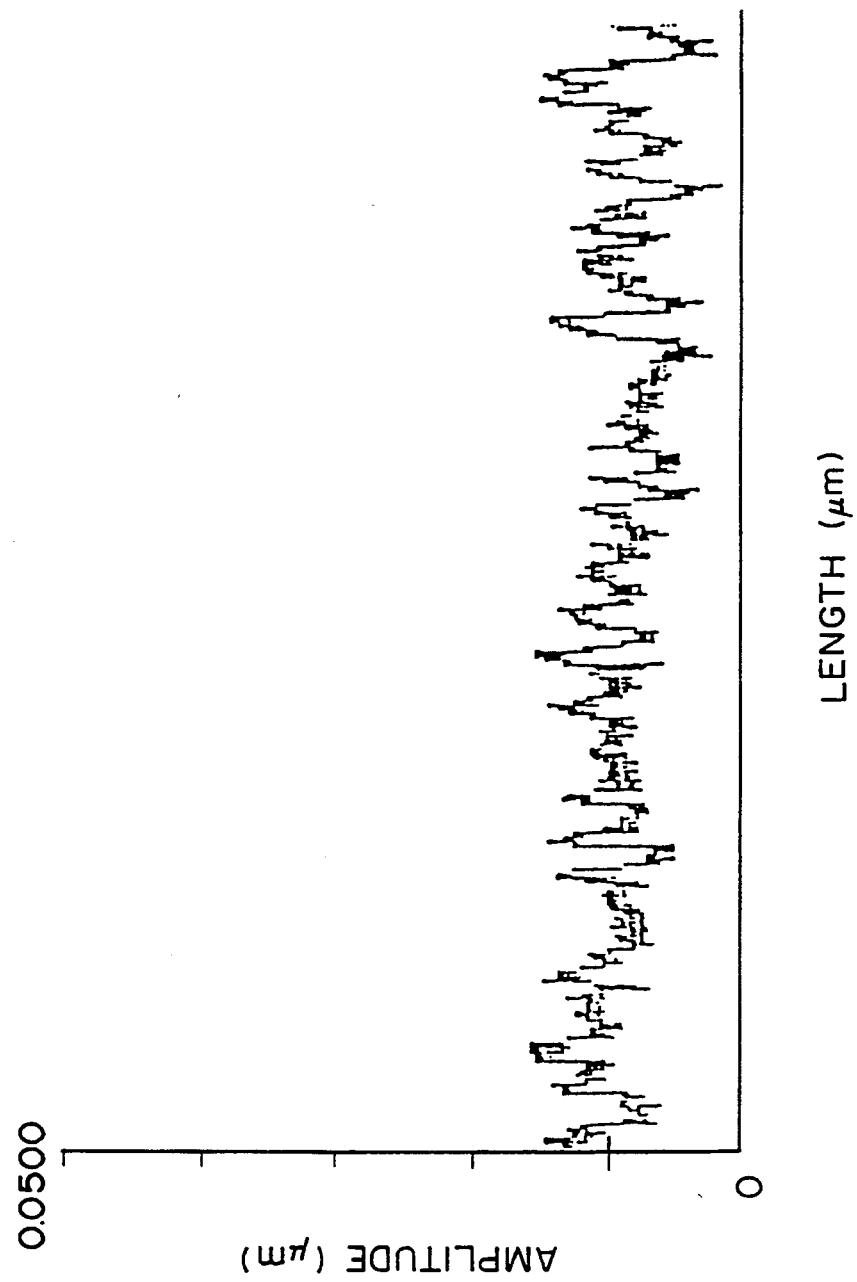
FIG. 5 shows a roughness curve obtained by measuring by HIPOSS an inversely sputtered air bearing of a slider which employs a non-magnetic substrate according to the present invention having an average grain size of 5 to 7 μm.
Figure 6:
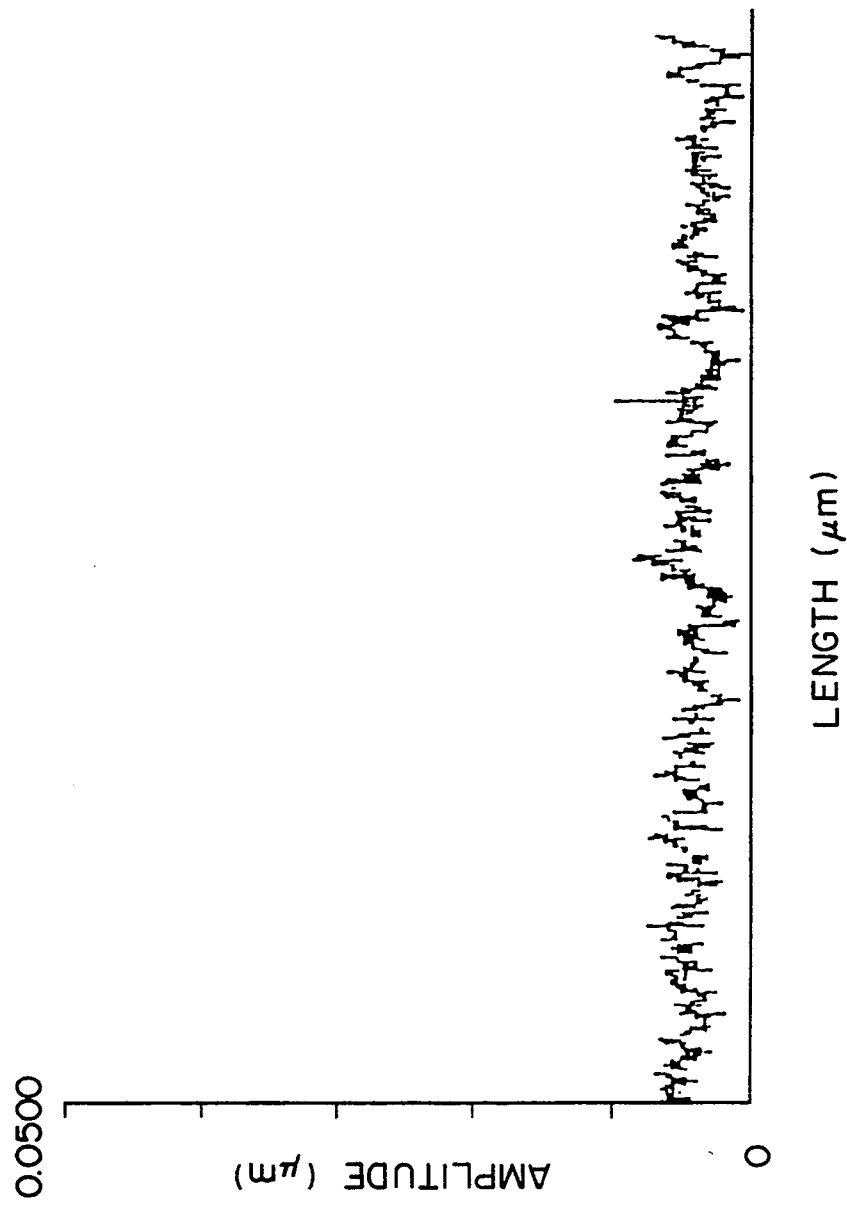
FIG. 6 shows a roughness curve obtained by measuring by HIPOSS an inversely sputtered air bearing of a slider which employs a non-magnetic substrate according to the comparative method having an average grain size of 3 to 4 μm.

FIG. 4 is a roughness curve, measured by HIPOSS, of an inversely sputtered air bearing surface of a slider constituted by a non-magnetic substrate material according to the present invention having an average crystal grain size of 8 to 12 $\mu$m. FIG. 5 is a roughness curve, measured by HIPOSS, of an inversely sputtered air bearing surface of a slider constituted by a non-magnetic substrate material according to the present invention having an average grain size of 5 to 7 $\mu$m. FIG. 6 is a roughness curve, measured by HIPOSS, of an inversely sputtered air bearing surface of a slider constituted by a conventional non-magnetic substrate having an average grain size of 3 to 4 $\mu$m. A difference in average level between the crests and troughs and the average pitch at which crests and troughs are repeated are more proper in the case of the non-magnetic substrate materials according to the present invention than in the comparative samples. In a non-magnetic substrate material having an average grain size of 8 to 12 $\mu$m, a difference in the average level between the crests and troughs and the average pitch are particularly desirable, and the resistance between the air bearing surface and the disk surface is small. On the other hand, on the comparative non-magnetic substrate having an average grain size of 3 to 4 $\mu$m, there were formed an insufficient roughness surface having such a state as being scratched finely, so that it was impossible to improve the CSS characteristics.

Figure 2:
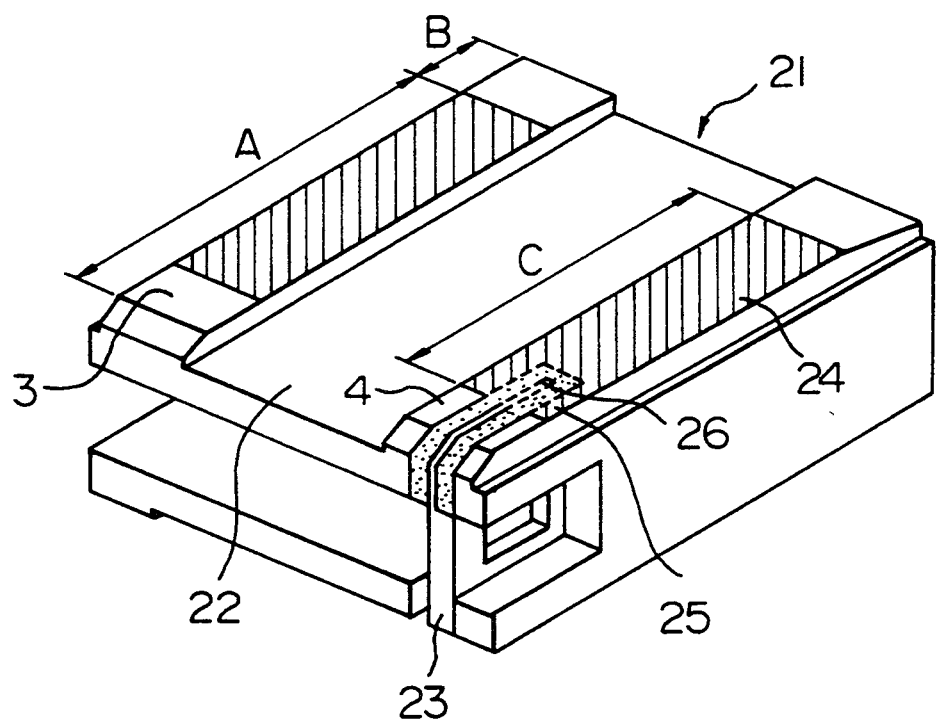
FIG. 2 is a perspective view of a composite type floating magnetic head according to the present invention.

In a case where the air bearing surface 24 of the magnetic head 21 shown in FIG. 2 was constituted by the spinel phase alone, it was difficult to form proper irregularities (roughness), and the area with which the air bearing surface makes contact with the magnetic recording medium was large, increasing the sliding resistance (frictional resistance) during CSS and thus reducing the service life of the disk device.

In another case where the air bearing surface 24 of the magnetic head 21 was constituted by the rock salt structure alone, it was difficult to form proper irregularities, increasing the area with which the air bearing surface makes contact with the magnetic recording medium, as in the case of the air bearing portion constituted by the spinel structure alone. In a still another case where the mixture ratio of the spinel phase to the rock salt structure was small, the ratio of the area of the protruding portion to the area of the recessed portion in the bearing surface 24, deteriorating the landing stability with which the disk device was stopped and was apt to cause sticking between the magnetic recording medium and the floating magnetic head when the recording medium was stopped. Thus, a desirable area ratio of the rock salt structure in the air bearing surface 24 of the magnetic head 21 is between 20 and 80%.

FIG. 1 is a perspective view of a thin film magnetic head in which the bearing 13 of the slider 12 is made irregular by inverse sputtering. Excellent roughness can be also formed as in the case of a composite type magnetic head.

Third Embodiment

CSS characteristics were tested using magnetic heads in which a non-magnetic substrate had a two phase structure comprising of a rock salt structure and a spinel structure and in which the air bearing surface was made properly rough by inverse sputtering.

CSS characteristic tests were conducted using 3.5 inch hard disks (substrate: aluminum, base film: Cr, magnetic film: Co—Cr—Ta sputtered film, the peripheral speed: 9.4 m/sec). The magnetic head was pressed against the magnetic disk which was in a halt state by a gimbal under a pressure of about 9.5 g-f. Evaluation was made by measuring the torque required to commence the rotation of the magnetic disk and then by converting the measured torque to a friction coefficient. A desired friction coefficient is 1.0 or less, with a more preferable coefficient being 0.7 or less.

Figure 7:
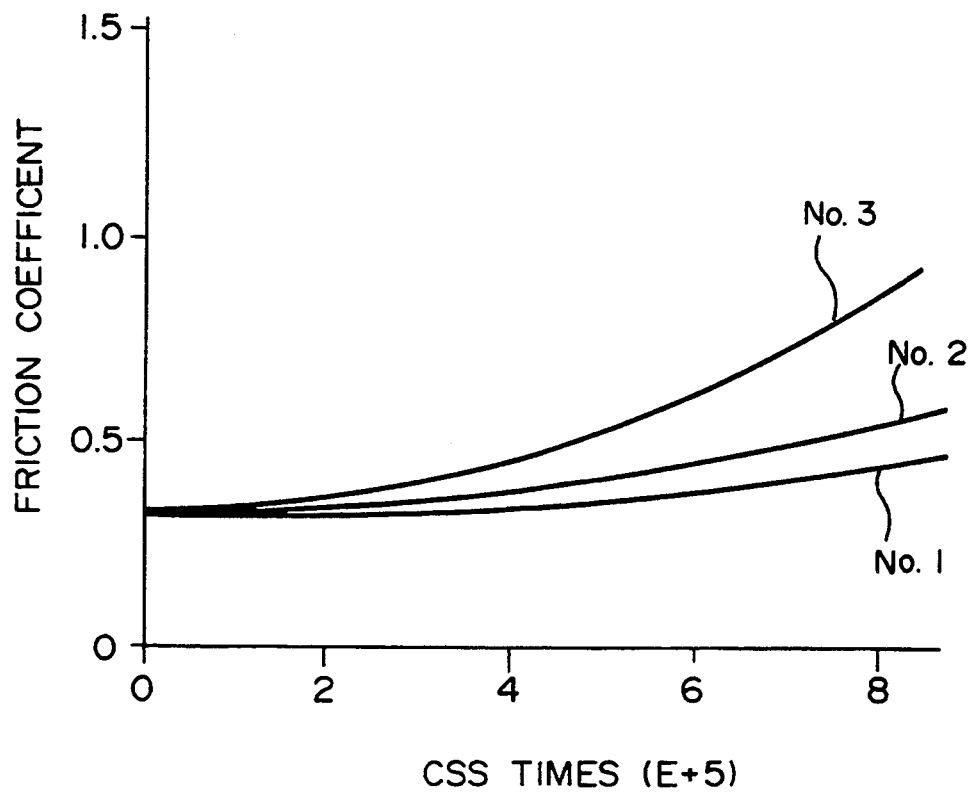
FIG. 7 is a graph showing results of the CSS characteristic tests conducted on the non-magnetic substrates according to the present invention and on that of a comparative example.
Figure 8:
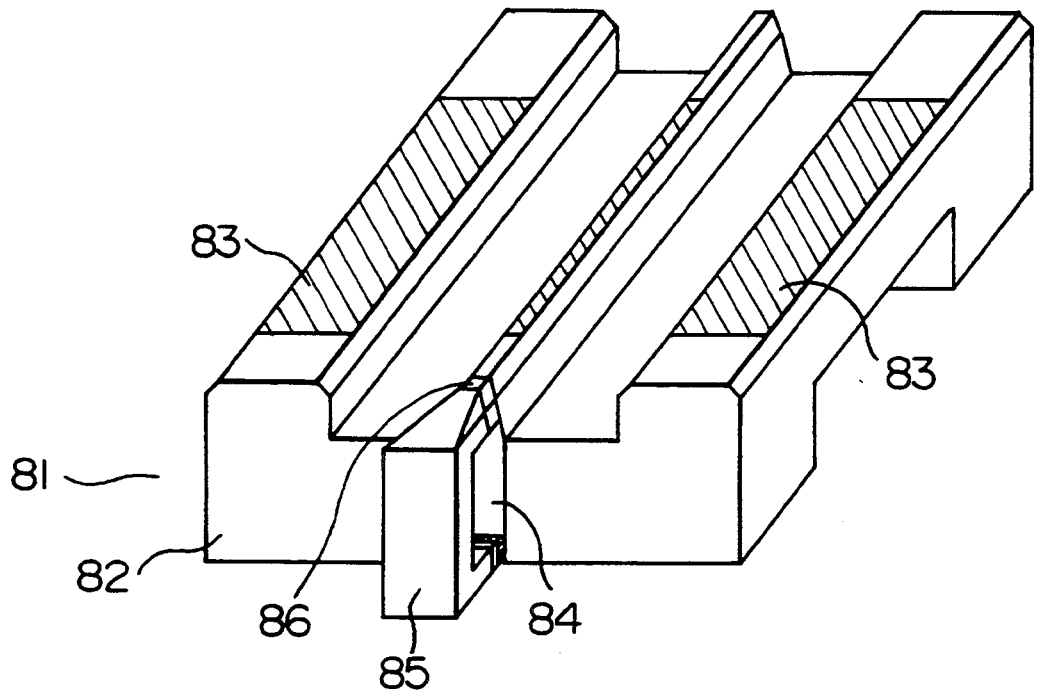
FIG. 8 is a perspective view of a monolithic floating magnetic head.
Figure 9A:
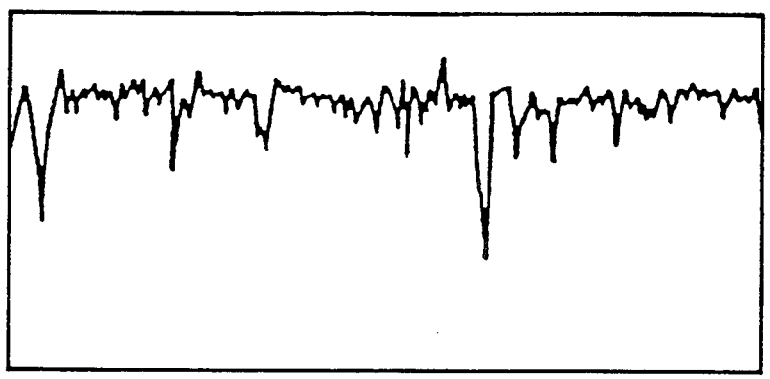
FIGS. 9A and 9B show roughness curves obtained by measuring a magnetic disk subjected to texture by HIPOSS.
Figure 9B:
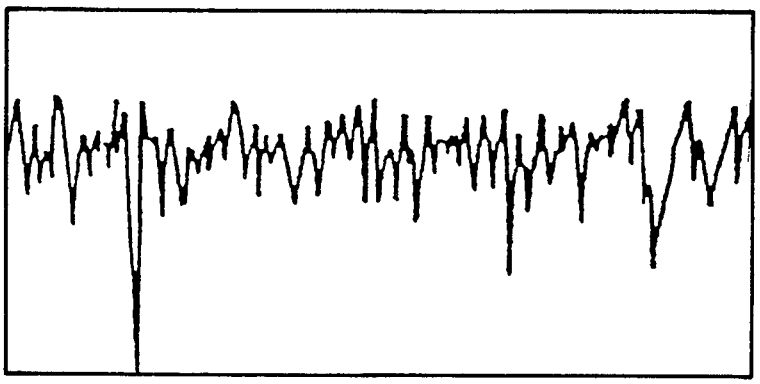

The results of the measurements are shown in FIG. 7.

A magnetic head No. 1 according to the present invention employed a non-magnetic substrate having a two-phase structure and an average grain size of 8 to 12 $\mu$m. A magnetic head No. 2 according to the present invention employed a non-magnetic substrate having a two-phase structure and an average grain size of 5 to 7 $\mu$m. As shown in FIG. 7, a friction coefficient of the magnetic heads Nos. 1 and 2 was 0.7 or less even when the repetition time of CSS exceeded 80,000. A friction coefficient of a magnetic head No. 3 which employed a conventional non-magnetic substrate having an average grain size of 3 to 4 $\mu$m was more than 0.7 when the repetition time of CSS reached 80,000.

As will be understood from the foregoing description, a slider is manufactured using a non-magnetic substrate material having a two-phase structure and an average grain size of 5 to 15 $\mu$m, and one phase of the two phases is selectively removed to form roughness on an air bearing surface of the magnetic head which opposes a magnetic recording medium. Consequently, CSS characteristics can be improved very much.

What is claimed is:

1. A floating magnetic head comprising: a slider with a non-magnetic substrate characterized in that the non-magnetic substrate has a main composition of MnO, NiO and a sub composition of $Al_2O_3$ whose composition consists of MnO of 20 to 80 wt % in terms of MnO, NiO of 20 to 80 wt % in terms of NiO, and $Al_2O_3$ of 1 to 20 wt % in terms of $Al_2O_3$, the structure of the substrate being a two-phase structure comprising a 20% to 80% rock salt type structure of (MnO, NiO) and a 80% to 20% spinel structure of (MnO, NiO) $Al_2O_3$, and said substrate having an average grain size of 5 to 15 $\mu$m.

2. A floating magnetic head according to claim 1, wherein the slider comprises a non-magnetic substrate having an average grain size from 8 to 12 μm.

3. A floating magnetic head according to claim 1, wherein the magnetic head comprises a composite type floating magnetic head and wherein the slider has an air bearing surface which opposes a recording medium, said air bearing surface comprising two phases one of which is selectively removed to form roughness on the surface.

4. A floating magnetic head according to claim 1, wherein the magnetic head comprises a floating thin-film magnetic head and wherein the slider has an air bearing surface which opposes a recording medium, said air bearing surface comprises two phases one of which is selectively removed to form roughness on the surface.

5. A floating magnetic head comprising: a slider with a non-magnetic substrate characterized in that the non-magnetic substrate has a two-phase structure having a main composition of a 20% to 80% rock salt type structure of (MnO, NiO) and a sub composition of a 80% to 20% spinel structure of (MnO, NiO) $Al_2O_3$, the substrate composition consisting of MnO of 20 to 80 wt % in terms of MnO, NiO of 20 to 80 wt % in terms of NiO, and $Al_2O_3$ of 1 to 20 wt % in terms of $Al_2O_3$, a part of said sub composition being replaced by at least one substance of not more than 5 wt % in total selected from a group consisting of CaO, $Y_2O_3$, $ZrO_2$, ZnO and SrO, said two phase structure having an average grain size of from 5 to 15 μm.

6. A floating magnetic head according to claim 5, wherein the slider comprises a non-magnetic substrate having an average grain size from 8 to 12 μm.

7. A floating magnetic head according to claim 5, wherein the magnetic head comprises a composite type floating magnetic head and wherein the slider has an air bearing surface which opposes a recording medium, said air bearing surface comprising two phases one of which is selectively removed to form roughness on the surface.

8. A floating magnetic head according to claim 5, wherein the magnetic head comprises a floating thin-film magnetic head and wherein the slider has an air bearing surface which opposes a recording medium, said air bearing surface comprising two phases one of which is selectively removed to form roughness on the surface.

* * * * *

UNITED STATES PATENT AND TRADEMARK OFFICE
CERTIFICATE OF CORRECTION

PATENT NO. : 5,347,412
DATED : September 13, 1994
INVENTOR(S) : Nitta, et al.

It is certified that error appears in the above-indentified patent and that said Letters Patent is hereby corrected as shown below:

Col. 3, line 39, change "200 nn" to --200 nm--.

Col. 5, line 37, delete "magnetic".

Col. 6, line 24, after "wt %" (first occurrence) insert --of--.

Col. 8, line 8, change "1shows" to --1 shows--.

Signed and Sealed this

Twenty-ninth Day of August, 1995

Attest:

BRUCE LEHMAN

*Attesting Officer*     *Commissioner of Patents and Trademarks*